US006176796B1

United States Patent
Lislegard

(10) Patent No.: US 6,176,796 B1
(45) Date of Patent: Jan. 23, 2001

(54) CONTINUOUSLY VARIABLE TRANSMISSION WITH CLUTCH HAVING ENHANCED AIR COOLING

(75) Inventor: Greg G. Lislegard, Roseau, MN (US)

(73) Assignee: Polaris Industries Inc., Minneapolis, MN (US)

( * ) Notice: Under 35 U.S.C. 154(b), the term of this patent shall be extended for 0 days.

(21) Appl. No.: 09/277,256

(22) Filed: Mar. 26, 1999

(51) Int. Cl.$^7$ .................................................. F16H 57/04
(52) U.S. Cl. .......................................................... 474/93
(58) Field of Search ........................................ 474/13, 93

(56) References Cited

U.S. PATENT DOCUMENTS

| | | | |
|---|---|---|---|
| 1,372,700 | * 3/1921 | Kimble | 474/93 |
| 2,953,032 | * 9/1960 | Ruess | 474/93 X |
| 3,618,412 | * 11/1971 | Schmid | 474/93 X |
| 3,861,229 | 1/1975 | Domaas . | |
| 4,493,677 | * 1/1985 | Ikenoya | 474/93 |
| 4,530,680 | * 7/1985 | Miranti | 474/93 |
| 4,631,977 | * 12/1986 | Kawashima | 474/93 X |
| 4,697,665 | 10/1987 | Eastman et al. | 180/230 |

* cited by examiner

Primary Examiner—Rodney H Bonck
(74) Attorney, Agent, or Firm—Fredrikson & Byron, P.A.

(57) ABSTRACT

A continuously variable transmission (CVT) having air cooling channels built into the outer face of at least one, and preferably more than one, of the sheaves of the clutches. The CVT is comprised of a drive clutch having an input shaft, a driven clutch having an output shaft, and an endless belt disposed about the drive and driven clutches. Each clutch includes an axially stationary sheave and an axially moveable sheave. Each sheave includes a sheave body with an inner, belt-engaging face and an outer face. At least one of the sheaves on one of the clutches has a plurality of generally radially oriented fins extending axially from the outer face of the sheave body. The sheave further includes an outer plate defining with the fins and the outer face of the sheave body a plurality of generally radially oriented air cooling channels. Each channel preferably is open at its radially outward end and at its radially inward end, thereby permitting air to enter the radially inward open ends, pass radially along the channels and exit through the radially outward open ends, thereby helping to cool the sheave body.

8 Claims, 5 Drawing Sheets

CONTINUOUSLY VARIABLE TRANSMISSION WITH CLUTCH HAVING ENHANCED AIR COOLING

TECHNICAL FIELD

The invention relates to continuously variable transmissions, such as those used on snowmobiles, and, in particular, to a continuously variable transmission having a clutch with structures for enhancing air cooling of the clutch.

BACKGROUND OF THE INVENTION

Split sheave continuously variable transmissions (CVT's) are used in a variety of recreational type off-road vehicles such as snowmobiles, golf carts, all-terrain vehicles (ATV's), and the like. CVT's, as their name implies, do not require shifting through a series of forward gears, but rather provide a continuously variable gear ratio that automatically adjusts as the vehicle speeds up or slows down, thus providing relatively easy operation for the rider.

Typically CVT's are comprised of a drive clutch, a driven clutch, and an endless V-belt disposed about the clutches. The drive clutch includes a pair of opposed sheaves, which together define a generally V-shaped "pulley" within which the V-belt rides. The driven clutch is similarly configured from a pair of opposed sheaves.

The sheaves of the drive clutch are normally biased (such as by a spring) away from each other and the sheaves of the driven clutch are normally biased toward each other. When the drive clutch is rotating at or near idle speed, the V-belt rides near the center of the drive clutch and near the outer periphery of the driven clutch. As the drive clutch rotates faster, a centrifugal mechanism in the drive clutch pushes one of the the drive clutch sheaves toward the other, squeezing the V-belt and pushing it radially outwardly. Because the V-belt is essentially inelastic, the belt is pulled radially inwardly on the driven clutch, causing one of the driven clutch sheaves to move axially away from the other driven clutch sheave.

Significant frictional forces occur between the clutch sheaves and the V-belt. Friction results not only from the inward and outward movement of the V-belt between the sheaves of the drive and driven clutches, but also from the constant compression of the clutch sheaves against the V-belt. That is, in order to enable the belt to transfer torque from the drive clutch to the driven clutch without slipping, it is important that the sheaves of the clutches squeeze relatively hard against the side walls of the V-belt.

Consequently, the friction of the V-belt against the sheaves creates a significant amount of heat. If this heat is not adequately removed from the sheaves, the belt can become quite hot, reducing its useful life.

Accordingly, it would be advantageous to provide for the efficient removal of heat from the clutch sheaves. For this purpose, some clutches are provided with vanes or ribs on the outer surface of one or more of the clutch sheaves. Such vanes or ribs create air turbulence that tends to assist in cooling the sheaves. Such turbulence is somewhat inefficient in removing heat, however, and it therefore reduces the performance of the vehicle more than would be desirable. Accordingly, it would be advantageous to provide for more efficient cooling of the clutch sheaves without significantly degrading the performance of the vehicle.

SUMMARY OF THE INVENTION

The invention provides a CVT having air cooling channels built into the outer face of at least one, and preferably more than one, of the sheaves of the clutches. The CVT is comprised of a drive clutch having an input shaft, a driven clutch having an output shaft, and an endless belt disposed about the drive and driven clutches. Each clutch includes an axially stationary sheave and an axially moveable sheave. Each sheave includes a sheave body with an inner, belt-engaging face and an outer face. At least one of the sheaves has a plurality of generally radially oriented fins extending axially from the outer face of the sheave body. The sheave further includes an outer plate defining with the fins and the outer face of the sheave body a plurality of generally radially oriented air cooling channels. Each channel preferably is open at its radially outward end and at its radially inward end, thereby permitting air to enter the radially inward open ends, pass radially outward through the channels and exit through the radially outward open ends, thereby helping to cool the sheave body.

DETAILED DESCRIPTION OF THE INVENTION

Figure 1A:
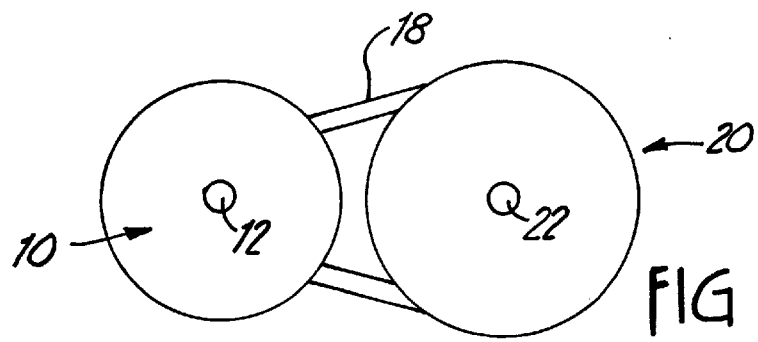
FIGS. 1a, 1b and 1c are diagrammatic side views.

The function and operation of continuously variable transmissions (CVT's) are well-known (see, e.g., U.S. Pat. No. 3,861,229, Domaas) and need not be described in detail. The CVT of the invention is designed for use on a snowmobile, but also may be used on such other vehicles as ATV's, golf carts and the like.

FIGS. 1a–1d illustrate in diagrammatic fashion the basic function of a CVT of the invention. The CVT includes a drive clutch 10 having an input shaft 12, a driven clutch 20 having an output shaft 22, and an endless V-belt 18 disposed about the drive and driven clutches. As indicated above, the drive clutch 10 includes a pair of opposed sheaves which together define a generally V-shaped "pulley" within which the V-belt 18 rides. One of the sheaves 14 is axially movable (i.e., movable in the direction parallel to the axis of the shaft 12), and the other sheave 16 is axially stationary. The driven clutch 20 is similarly configured from a pair of opposed sheaves, one being axially movable 24 and the other being axially stationary 26.

Figure 1B:
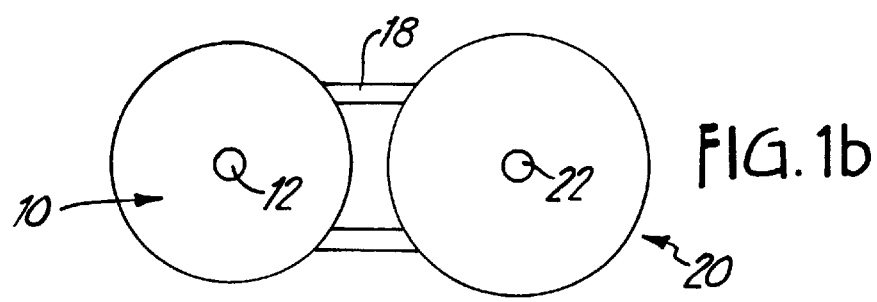
Figure 1C:
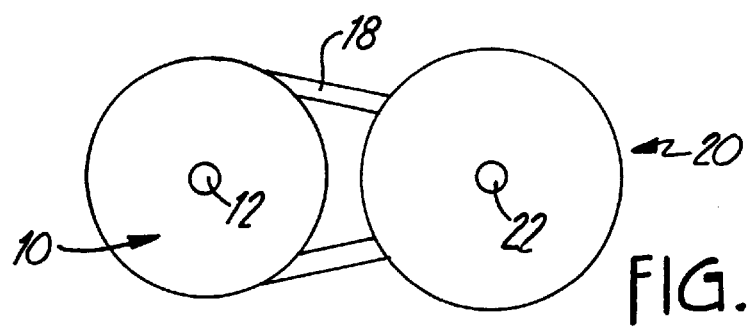
Figure 1D:
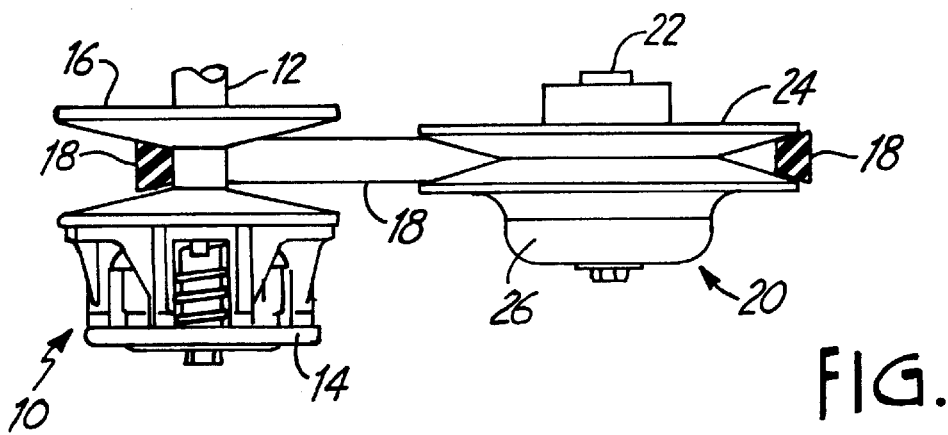
FIG. 1d is a diagrammatic top view, of a CVT of the invention, FIGS. 1a and 1d being in a near-idle position, FIG. 1b being in an intermediate position, and FIG. 1c being in a high speed position.

The sheaves 14 and 16 of the drive clutch 10 are normally biased (such as by a spring) axially away from each other, and the sheaves 24 and 26 of the driven clutch 20 are normally biased axially toward each other (typically by a spring). When the drive clutch 10 is stationary or rotating at idle speed (see FIGS. 1a and 1d), the V-belt 18 rides near the center of the drive clutch 10 and near the outer periphery of the driven clutch 20. As the drive clutch 10 begins to rotate faster, a centrifugal mechanism in the axially movable sheave 14 of the drive clutch 10 causes the axially movable sheave 14 to move toward the axially stationary sheave 16, squeezing the V-belt 18 radially outwardly. Because the V-belt 18 is essentially inelastic, the belt 18 is pulled radially inwardly on the driven clutch 20, causing the axially movable sheave 24 of the driven clutch 20 to move axially away from the axially stationary sheave 26. FIG. 1b shows the position of the V-belt 18 at an intermediate speed, and FIG. 1c shows the position of the V-belt 18 at top speed.

Figure 2:
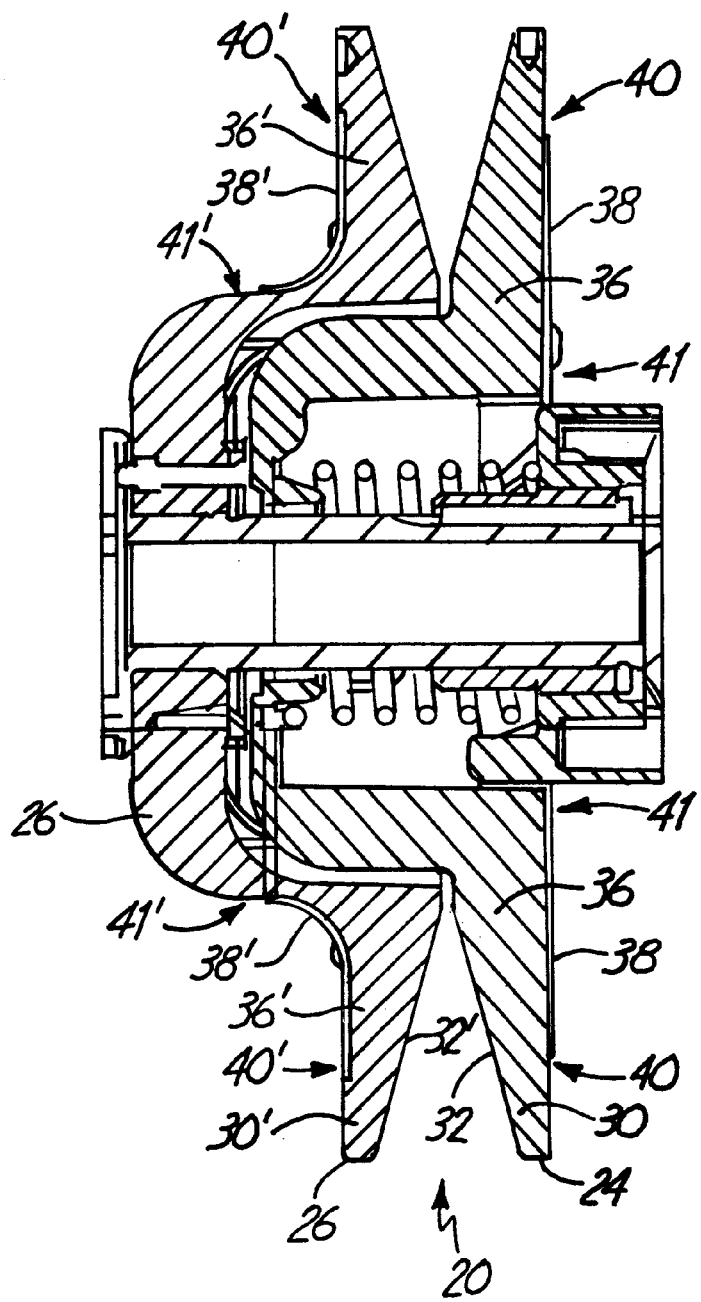
FIG. 2 is a cross-sectional view of a driven clutch of the CVT of the invention.
Figure 3:
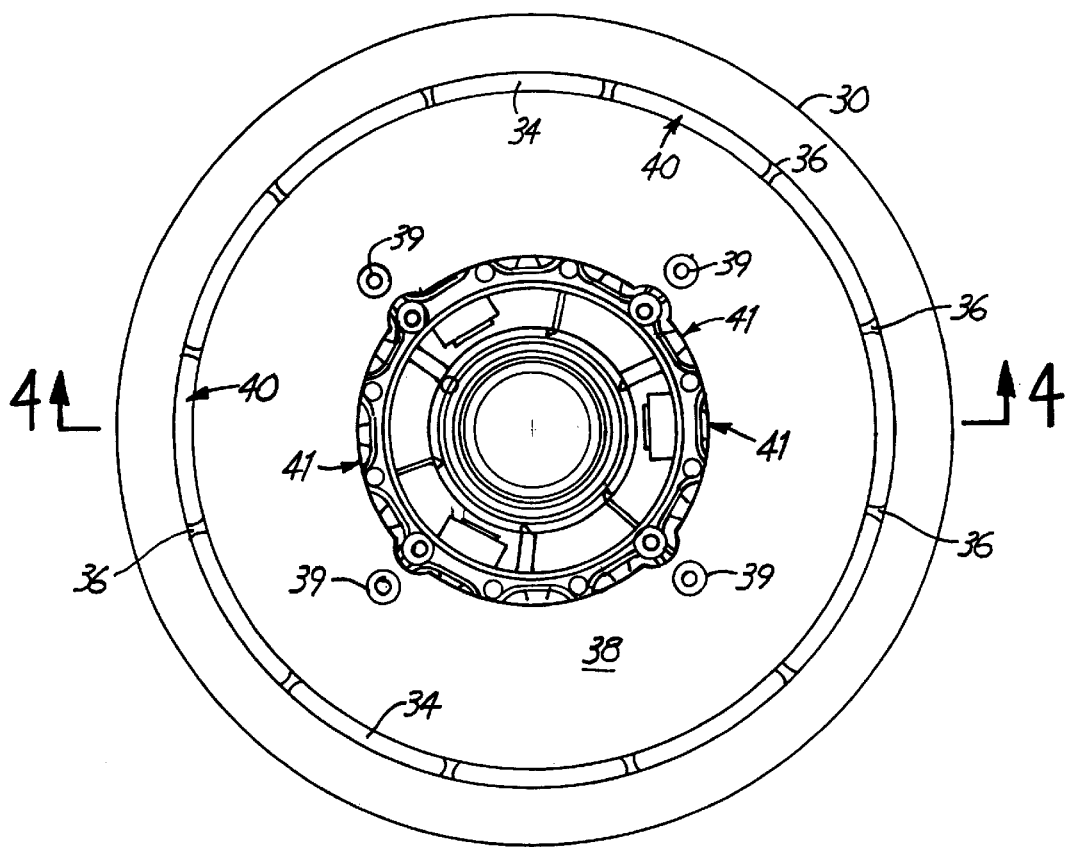
FIG. 3 is a side view of a driven clutch of the CVT of the invention.
Figure 4:
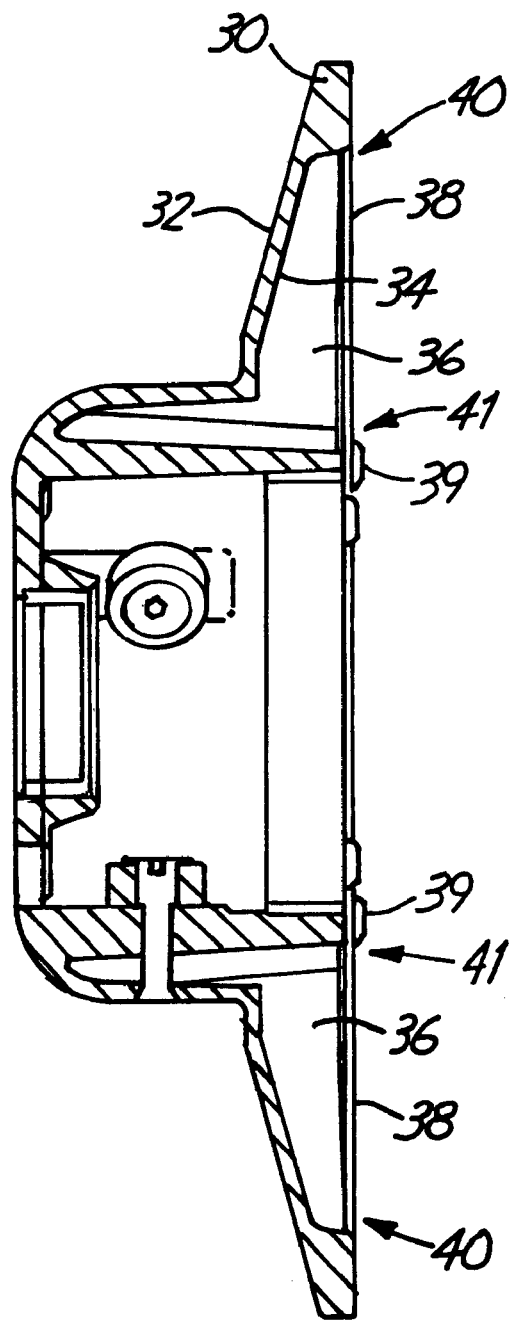
FIG. 4 is a cross-sectional view of FIG. 3, taken along lines 4—4 thereof.

FIGS. 2–4 show the details of the driven clutch 20. The axially movable sheave 24 has a sheave body 30 with an inner face 32 an outer face 34 (see FIG. 4), and a plurality of generally radially oriented fins 36 extending axially from the outer face 34 of the sheave body 30. The sheave 24 also includes an outer plate 38 secured to the sheave body 30 by a plurality of bolts 39. The outer plate 38 defines with the fins 36 and the outer face 34 of the sheave body 30 a plurality of generally radially oriented air cooling channels. The channels are formed so as to have radially outward open ends 40 and radially inward open ends 41, thereby permitting air to enter the radially inward open ends 41, pass radially through the channels and exit through the radially outward open ends 40. As the air passes through the channels, it assures constant movement of the air adjacent to the outer face 34 and the fins 36, thus picking up heat from the sheave body 30 and fins 36 to cool the sheave 24.

In the preferred embodiment shown in the drawings, the fins 36 are essentially radially straight, thereby defining generally radially straight channels. If desired, however, the fins could be radially curved, spiral or configured in other shapes, as desired, to form channels of corresponding curved or spiral or other shapes. Also, in the preferred embodiment shown in the drawings the axially outward edges of all of the fins 36 on the movable sheave 24 are generally co-planar with one another, so that the essentially flat plate 38 abuts these axially outward edges substantially along the entire radial extent of the plate 38. Again, however, if desired, the fins and/or the plate could have alternate configurations such that the fins would not necessarily have to touch the plate along its entire radial extent. To provide good direction to the air flow through the channels without undue turbulence, however, it is desirable that at least some of the fins abut the plate along at least half of the radial length of the fins, thereby defining discrete air cooling channels, and preferably all of the fins abut the plate along the entire radial length of the plate 38.

FIG. 2 shows the details of the axially stationary sheave 26 of the driven clutch 20. Like the axially movable sheave 24, the axially stationary sheave includes a body 30' with an inner face 32' an outer face (not visible in this view), and a plurality of generally radially oriented fins 36' extending axially from the outer face 34' of the sheave body 30'. The sheave 26 also includes an outer plate 38' defining with the fins 36' and the outer face 34' of the sheave body 30' a plurality of generally radially oriented air cooling channels. The channels are formed so as to have radially outward open ends 40' and radially inward open ends 41', thereby permitting air to enter the radially inward open ends 41', pass radially through the channels and exit through the radially outward open ends 40'. As the air passes through the channels, it picks up heat from the sheave body 30' and fins 36', thereby helping to cool the sheave 26.

Figure 5:
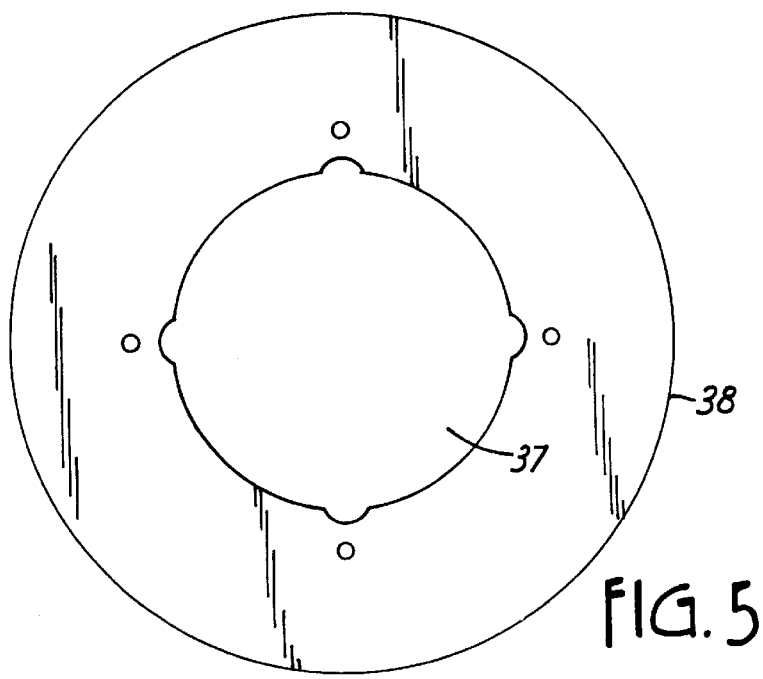
FIG. 5 is a plan view of a plate attachable to the movable sheave of the driven clutch shown in FIGS. 2–4.
Figure 6:
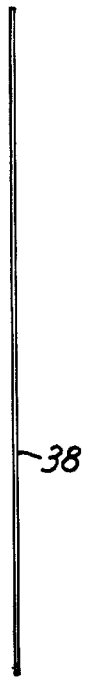
FIG. 6 is a side view of the plate of FIG. 5.
Figure 7:
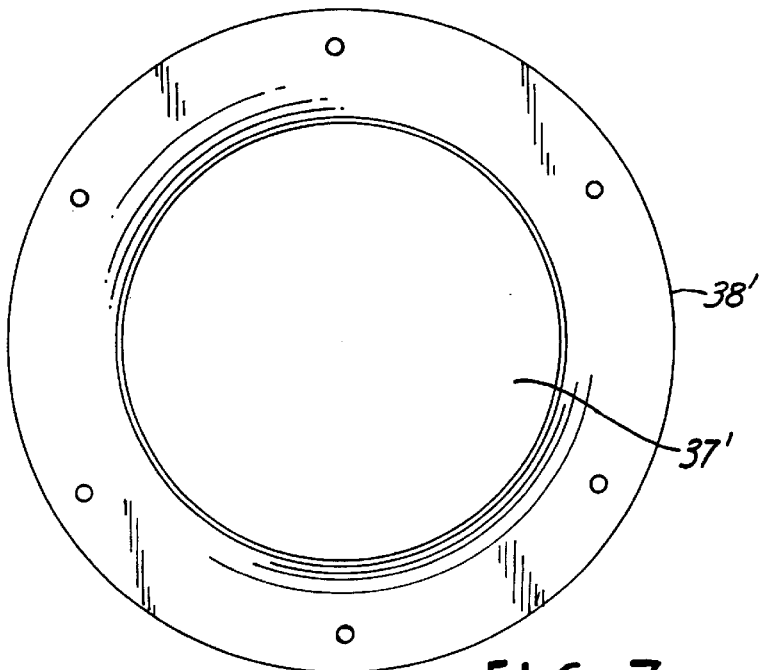
FIG. 7 is a plan view of a plate attachable to the stationary sheave of the driven clutch shown in FIG. 2.
Figure 8:
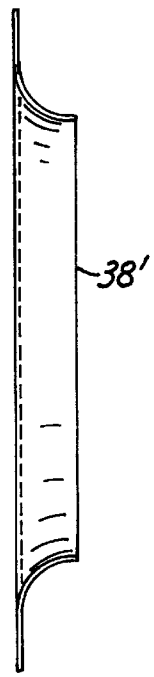
FIG. 8 is a side view of the plate of FIG. 7.

The plate 38' of the axially stationary sheave 26 is not flat like the plate 38 of the axially movable sheave 24, however, because the axially outward edges of the fins are not coplanar along their entire length. FIG. 5–8 depict the configurations of the two plates 38 and 38', and illustrate how the plate can be formed into any suitable shape. The plate of FIGS. 5–6 is generally circular with a central opening 37. The plate 38' of FIGS. 7–8 also is generally circular with a central opening 37', but it is also curved axially outwardly toward the center to follow the profile of the fins 36' of the axially stationary sheave 26. Of course, the plate can be made in any other suitable shape to correspond to the shape of the fins 36', thereby creating a suitably shaped air cooling channel.

The preferred CVT shown in the drawings includes the cooling channels on both sheaves of the driven clutch. Optionally, such channels may be utilized on just one of the sheaves. Moreover, such channels may also be utilized on the sheaves of the drive clutch in much the same fashion as on the driven clutch.

While a preferred embodiment of the present invention has been described, it should be understood that various changes, adaptations and modifications may be made therein without departing from the spirit of the invention and the scope of the appended claims.

What is claimed is:

1. A continuously variable transmission comprising:

a drive clutch having an input shaft;

a driven clutch having an output shaft; and an endless belt disposed about the drive and driven clutches;

the drive and driven clutches each being comprised of an axially stationary sheave and an axially moveable sheave, each sheave having a sheave body with an inner face and an outer face, at least one of the sheaves having a plurality of generally radially oriented fins extending axially from the outer face of the sheave body, such sheave carrying an outer plate defining with the fins and the outer face of the sheave body a plurality of generally radially oriented cooling channels, the plate being generally circular with a central opening, the plate being curved axially outwardly toward the central opening.

2. The continuously variable transmission of claim 1 wherein the plate, the fins and the sheave body are sized and shaped to define radially extending air cooling channels having radially outward open ends.

3. The continuously variable transmission of claim 1 wherein the plate, the fins and the sheave body are sized and shaped to define generally radially extending air cooling channels having radially outward open ends and radially inward open ends, thereby permitting air to enter the radially inward open ends, pass radially outward along the channels and exit through the radially outward open ends, thereby helping to cool the sheave body.

4. The continuously variable transmission of claim 1 wherein each fin has a radial length, and at least some of the fins abut the plate along at least half of their radial length, thereby defining discrete air cooling channels.

5. The continuously variable transmission of claim 1 wherein each sheave of the driven clutch includes such fins and such an outer plate defining with the outer face of the sheave body a plurality of radially extending air cooling channels.

6. The continuously variable transmission of claim 1 wherein at least one sheave of the driven clutch includes such fins and such an outer plate defining with the outer face of the sheave body a plurality of radially extending air cooling channels.

7. The continuously variable transmission of claim 1 wherein at least one sheave of the drive clutch includes such fins and such an outer plate defining with the outer face of the sheave body a plurality of radially extending air cooling channels.

8. The continuously variable transmission of claim 1 wherein the fins are radially generally straight.

* * * * *